United States Patent
Park et al.

(10) Patent No.: US 10,401,912 B2
(45) Date of Patent: Sep. 3, 2019

(54) PROTECTION CASE FOR PORTABLE ELECTRONIC DEVICE AND METHOD FOR DETERMINING STATE THEREOF

(71) Applicant: Samsung Electronics Co., Ltd., Gyeonggi-do (KR)

(72) Inventors: Byung Lyul Park, Gyeonggi-do (KR); Seung Jai Lee, Gyeonggi-do (KR); Bo Ra Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 179 days.

(21) Appl. No.: 15/415,485

(22) Filed: Jan. 25, 2017

(65) Prior Publication Data

US 2017/0212557 A1    Jul. 27, 2017

(30) Foreign Application Priority Data

Jan. 25, 2016    (KR) .................. 10-2016-0008584

(51) Int. Cl.
*G06F 1/16* (2006.01)
*G06F 9/54* (2006.01)

(52) U.S. Cl.
CPC ............ *G06F 1/1677* (2013.01); *G06F 1/166* (2013.01); *G06F 1/1626* (2013.01); *G06F 9/542* (2013.01); *G06F 2200/1634* (2013.01)

(58) Field of Classification Search
CPC ...... G06F 1/1677; G06F 1/1626; G06F 1/166; G06F 9/542; G06F 2200/1634

USPC ........................................................ 174/552
See application file for complete search history.

(56) References Cited

U.S. PATENT DOCUMENTS

| | | | | |
|---|---|---|---|---|
| 6,809,462 B2 * | 10/2004 | Pelrine | ................. | A63H 3/365 310/319 |
| 8,704,427 B2 * | 4/2014 | Futter | ................. | G06F 1/1616 310/339 |
| 9,053,651 B2 * | 6/2015 | Yeo | ......................... | G09G 5/00 |
| 9,159,260 B2 * | 10/2015 | Oh | ......................... | G09G 3/20 |
| 2007/0286556 A1 * | 12/2007 | Kassamakov | ......... | G06F 1/1616 385/88 |
| 2013/0286462 A1 * | 10/2013 | Yeo | ......................... | G09G 5/00 359/291 |

FOREIGN PATENT DOCUMENTS

KR    20140016098    2/2014

* cited by examiner

*Primary Examiner* — Andargie M Aychillhum
*Assistant Examiner* — Michael F McAllister
(74) *Attorney, Agent, or Firm* — The Farrell Law Firm, P.C.

(57) ABSTRACT

A portable electronic device and a protection case thereof are provided. The portable electronic device includes a memory; a display; and a processor configured to acquire, from a flexible element included in a protection case of the portable electronic device, a characteristic value of the flexible element, the characteristic value changing according to bending of the flexible element through movement of the protection case, and determine a state of the protection case, based in the acquired characteristic value.

9 Claims, 11 Drawing Sheets

PROTECTION CASE FOR PORTABLE ELECTRONIC DEVICE AND METHOD FOR DETERMINING STATE THEREOF

PRIORITY

This application claims priority under 35 U.S.C. § 119(a) to Korean Patent Application Serial No. 10-2016-0008584, which was filed in the Korean Intellectual Property Office on Jan. 25, 2016, the entire disclosure of which is incorporated herein by reference.

BACKGROUND

1. Field of the Disclosure

The present disclosure relates generally to a protection case for a portable electronic device, and more particularly to a method for determining a state of the protection case.

2. Description of the Related Art

Protection cases are commonly used to protect portable electronic devices and as means for showing personalities or diversities of consumers.

Further, when a protection case covers a screen of the portable electronic device, an opening/closing state of the protection case may be used to control the portable electronic device.

For example, a conventional protection case for a portable electronic device may include a magnetic material, and the portable electronic device may include a sensor (e.g., a Hall sensor) for detecting a magnetic property of the magnetic material. However, as the magnetic material is arranged on a front surface of the protection case, it is difficult to manufacture a protection case having a transparent front surface. Further, when a magnetized card, for example, a credit card or hotel key, is inserted within a card holder provided in the protection case for a specific period of time, the magnetic properties of the card may be damaged by the magnetic material arranged in the protection case.

Additionally, the sensor for detecting the magnetic property of the magnetic material arranged in the protection case may also recognize another magnetic material, causing the electronic device to malfunction.

SUMMARY

The present disclosure is made to address at least the above-mentioned problems and/or disadvantages and to provide at least the advantages described below.

Accordingly, an aspect of the present disclosure is to provide a protection case of a portable electronic device that includes a flexible element (e.g., an electro active polymer (EAP) sensor), of which a characteristic value changes as the shape of the flexible element changes, in a hinge part of the protection case, and a method for determining an opening/closing state of the case, based on the characteristic value of the flexible element.

In accordance with an aspect of the present disclosure, a portable electronic device is provided, which includes a memory; a display; and a processor configured to acquire, from a flexible element included in a protection case of the portable electronic device, a characteristic value of the flexible element, the characteristic value changing according to bending of the flexible element through movement of the protection case, and determine a state of the protection case, based in the acquired characteristic value.

In accordance with an aspect of the present disclosure, a protection case is provided for a portable electronic device.

The protection case includes a front surface part; a side surface part that extends from the front surface part; a rear surface part that extends from the side surface part and connects to a rear surface of the portable electronic device; and a flexible element arranged at at least a portion of the front surface part, the side surface part, and the rear surface part, the flexible element having a characteristic value that changes according to bending of the flexible element through by manipulating a shape of the protection case.

In accordance with an aspect of the present disclosure, a method is provided for determining a state of a protection case by a portable electronic device. The method includes acquiring, from a flexible element included in the protection case of the portable electronic device, a characteristic value of the flexible element included in the protection case, the characteristic value changing according to bending of the flexible element through movement of the protection case; comparing the acquired characteristic value with a predefined characteristic value; and determining the state of the protection case based on the comparison.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
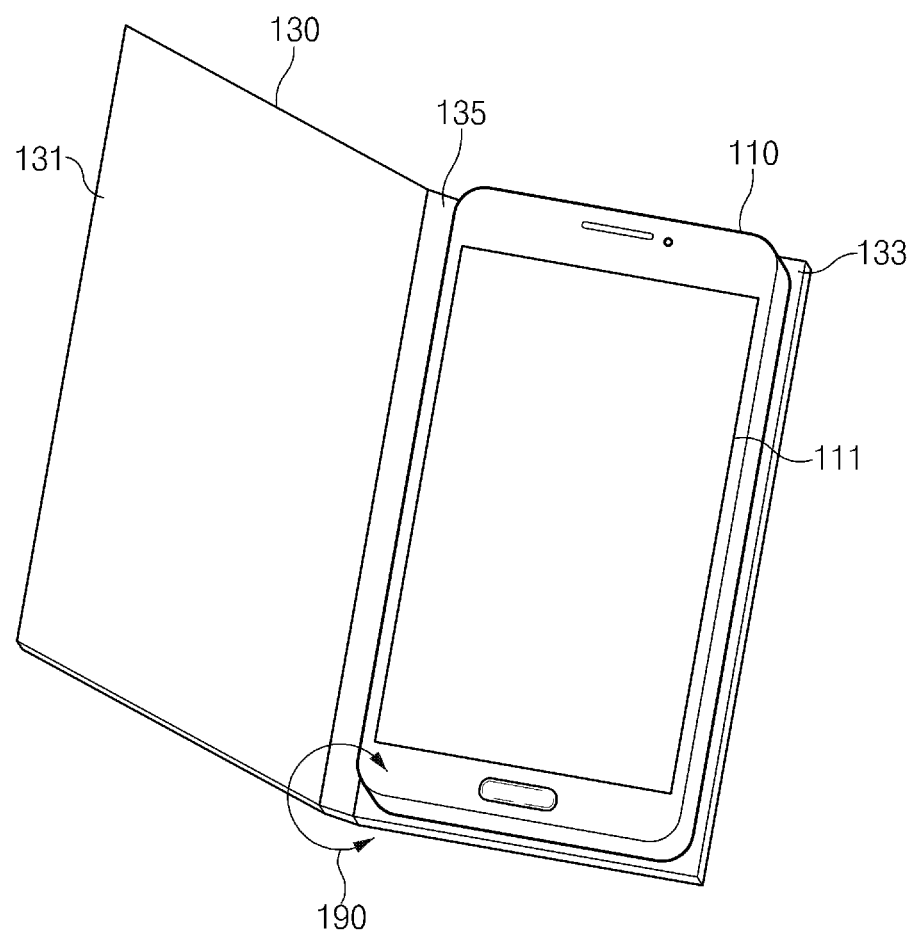
FIG. 1 illustrates a portable electronic device and a protection case that protects the portable electronic device according to an embodiment of the present disclosure.

Hereinafter, various embodiments of the present disclosure are disclosed with reference to the accompanying drawings. However, the present disclosure is not intended to be limited by the various embodiments of the present disclosure and it is intended that the present disclosure covers all modifications, equivalents, and/or alternatives of the present disclosure that come within the scope of the appended claims and their equivalents. With respect to the descriptions of the accompanying drawings, like reference numerals refer to like elements, features, and structures.

The terms and words used in the following description and claims are not limited to their dictionary meanings, but are used to provide a clear and consistent understanding of the present disclosure. Accordingly, it should be apparent to those skilled in the art that the following description of various embodiments of the present disclosure is provided for illustration purposes only and not for the purpose of limiting the present disclosure.

Singular forms such as "a," "an," and "the" include plural forms unless the context clearly dictates otherwise. Thus, for example, reference to "a component surface" includes reference to one or more of such surfaces.

All terms used herein may have meanings that are generally understood by a person skilled in the art. In general, terms defined in a dictionary should be considered to have the same meanings as the contextual meanings in the related art, and should not be understood differently or as having excessively formal meanings unless expressly defined as such herein. In any case, even the terms defined in the present specification are not intended to be interpreted as excluding embodiments of the present disclosure.

The terms "include," "comprise," "have", "may include," "may comprise" and "may have" indicate disclosed functions, operations, or existence of elements, but do not exclude other functions, operations, or elements.

For example, the expression "A or B" or "at least one of A and/or B" may indicate (1) at least one A, (2) at least one B, or (3) both at least one A and at least one B.

The terms such as "1st," "2nd," "first," "second," etc., may be used to distinguish various different elements, but are not intended to limit the elements. For instance, "a first user device" and "a second user device" may indicate different user devices, regardless of order or importance. Accordingly, a first component may be referred to as a second component, and vice versa, without departing from the scope and spirit of the present disclosure.

When a component (e.g., a first component) is referred to as being "operatively or communicatively coupled with/to" or "connected to" another component (e.g., a second component), the first component may be directly connected to the second component or may be indirectly connected to the second component through another component (e.g., a third component). However, when the first component is referred to as being "directly connected to" or "directly accessed" the second component, no other component exists therebetween.

The expression "configured to" may be interchangeably used with "suitable for," "having the capacity to," "designed to," "adapted to," "made to," or "capable of" according to context. Additionally, "configured to" does not necessarily indicate "specifically designed to" in terms of hardware. Instead, "a device configured to" may indicate that the device and another device or part are "capable of." For example, "a processor configured to perform A, B, and C" may indicate a dedicated processor, such as an embedded processor, for performing a corresponding operation or a general purpose processor, such as a central processing unit (CPU) or application processor (AP), for performing corresponding operations by executing at least one software program stored in a memory device.

An electronic device according to an embodiment of the present disclosure may be a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may be an accessory-type device (e.g., a watch, a ring, a bracelet, an anklet, a necklace, glasses, a contact lens, a head-mounted device (HMD), etc.), a textile-type or clothing-integrated-type device (e.g., electronic apparel), a body-attached-type device (e.g., a skin pad or a tattoo), or a bio-implantable-type device (e.g., an implantable circuit)

An electronic device may also be a home appliance, such as a television (TV), a digital video/versatile disc (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

An electronic device may also be a medical device (e.g., a portable medical measurement device, such as a blood glucose measuring device, a heart rate measuring device, a blood pressure measuring device, a body temperature measuring device, etc., a magnetic resonance angiography (MRA) device, a magnetic resonance imaging (MRI) device, a computed tomography (CT) device, a scanner, an ultrasonic device, etc.), a navigation device, a global navigation satellite system (GNSS), an event data recorder (EDR), a flight data recorder (FDR), a vehicle infotainment device, electronic equipment for a vessel (e.g., a navigation system, a gyrocompass, etc.), avionics, a security device, a head unit for a vehicle, an industrial or home robot, an automatic teller machine (ATM), a point of sales (POS) device of a store, or an Internet of things (IoT) device (e.g., a light bulb, a sensor, an electric or gas meter, a sprinkler, a fire alarm, a thermostat, a streetlamp, a toaster, exercise equipment, a hot water tank, a heater, a boiler, etc.).

An electronic device may include a part of furniture or a building/structure, an electronic board, an electronic signature receiving device, a projector, or a measuring instrument (e.g., a water meter, an electricity meter, a gas meter, a wave meter, etc.).

An electronic device may also be a flexible device.

An electronic device may also be a combination of some of the above-mentioned devices.

However, an electronic device according to an embodiment of the present disclosure is not limited to the above-mentioned devices, and may include new electronic devices with the development of new technology.

Herein, the term "user" refer to a person who uses an electronic device or may refer to a device (e.g., an artificial intelligence (AI) electronic device) that uses an electronic device.

FIG. 1 illustrates a portable electronic device and a protection case according to an embodiment of the present disclosure.

Referring to FIG. 1, the portable electronic device include a housing 110 that defines an external appearance of the portable electronic device. the housing 110 includes a first surface (i.e., a front surface) that faces a first direction, a second surface (i.e., a rear surface) that faces a second direction that is opposite to the first direction, and a side surface that at least partially surrounds a space between the first surface and the second surface. An outer protection layer including a transparent material (e.g., glass) is provided on the front surface of the housing 110 such that various contents on a display 111 is visible to a user.

The housing 110 of the portable electronic device may be covered by and coupled to a protection case 130. The protection case 130 includes a front surface part 131 that covers the front surface of the housing 110, a side surface part 135 that extends from the front surface part 131 and covers a side surface of the cover 110, and a rear surface part 133 that extends from the side surface part 135 and covers the rear surface of the housing 110. A coupling member may be further provided on the rear surface part 133 of the protection case 130 such that the portable electronic device may be fixed to the protection case 130.

The front surface part 131 of the protection case 130 may be hinged by a hinge part formed at at least a portion of the side surface part 135 such that the front surface of the housing 110 may be opened and closed (hinge operation 190). The hinge part may be also formed in an area in which the front surface part 131 and the side surface part 135 of the protection case 130 are connected with each other and an area in which the rear surface part 133 and the side surface part 135 are connected with each other, and may be configured such that the front surface part 131 and the rear surface part 133 define a specific angle in a specific range with the side surface part 135 according to the hinge operation 190. The hinge part may be formed at a portion of or alone the entire side surface part 135 of the protection case 130, and in this case, the side surface part 135 may have an arc shape having a specific curvature.

Alternatively, the rear surface part 133 of the protection case 130 may be omitted. In this case, the side surface part 135 of the protection case 130 may be coupled to the side surface) of the housing 110 of the portable electronic device.

The hinge part of the protection case 130 may include a flexible element (e.g., an electro active polymer (EAP) sensor), which has a characteristic value (e.g., a capacitance) that changes as the shape of the flexible element changes. Accordingly, if the hinge part is curved or extended by the hinge operation 190, the flexible elements provided in the hinge part is deformed and the characteristic value thereof may change. The portable electronic device may compare the changed characteristic value with a predefined characteristic value of the flexible element to determine an opening/closing state of the protection case 130.

Figure 2:
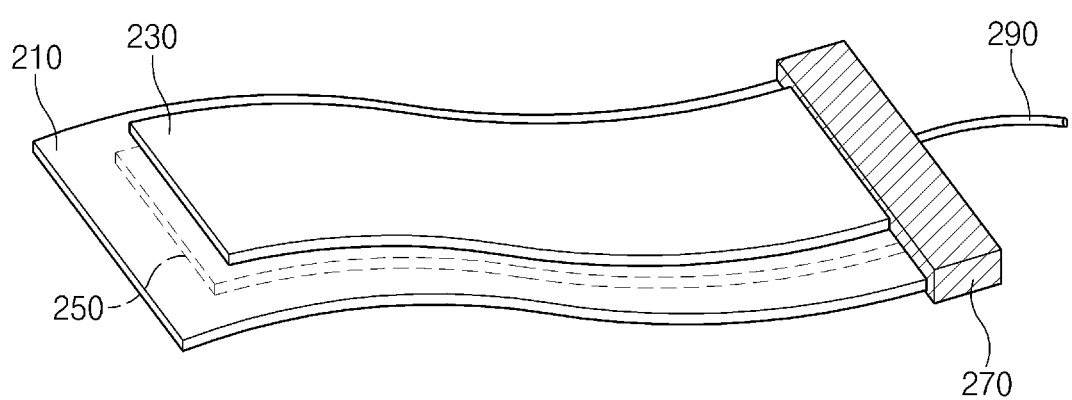
FIG. 2 illustrates a flexible element according to an embodiment of the present disclosure.

FIG. 2 illustrates a flexible element according to an embodiment of the present disclosure.

Referring to FIG. 2, the flexible element (e.g., an EAP sensor) includes a resilient dielectric body 210, a first flexible electrode 230 and a second flexible electrode 250 that are attached to opposite surfaces of the resilient dielectric body 210, respectively, a measurement circuit part 270 that measures a characteristic value (e.g., a capacitance) of the flexible element, and a connector 290 that is connected with an external device. The flexible element may be a capacitive element.

The resilient dielectric body 210 is interposed between the first flexible electrode 230 and the second flexible electrode 250, and is formed of a resilient body, of which a thickness may change, to be curved or extended by an external force. As a spacing distance between the first flexible electrode 230 and the second flexible electrode 250 changes due to the deformation of the resilient dielectric body 210, the characteristic value of the flexible element may change.

The first flexible electrode 230 and the second flexible electrode 250 may include a conductor that may be curved by an external force. The first flexible electrode 230 and the second flexible electrode 250 may be arranged parallel to each other. The first flexible electrode 230 and the second flexible electrode 250 may be formed of the same or similar materials.

The measurement circuit part 270 may include a circuit that measures a characteristic value of the flexible element. For example, the measurement circuit part 270 may measure a capacitance of the flexible element. The measurement circuit part 270 may be electrically connected with the first flexible electrode 230 and the second flexible electrode 250. The measurement circuit part 270 may deliver the measured capacitance to an external device through the connector 290. For example, FIG. 2 illustrates the measurement circuit part 270 formed inside a box of an insulating material.

The connector 290 may provide a connection interface with an external device. The connector 290 may supply electric power to the measurement circuit part 270, and may deliver the measured characteristic value to the external device. The connector 290 may be formed on one side of the insulating material that surrounds the measurement circuit part 270 to be electrically connected with the measurement circuit part 270. Although FIG. 2 illustrates the connector 290 as a cable, the present disclosure is not limited thereto. For example, the connector 290 may be provided as a pogo pin, and in this case, the connector 290 and the insulating material that surrounds the measurement circuit part 270 may define a pogo connector together.

Alternatively, the connector 290 may be omitted and a communication module may be provided to in the flexible element in order to communicate with an external device. For example, the communication module may be arranged adjacent to the measurement circuit part 270 and may be electrically connected with the measurement circuit part 270. The flexible element may transmit (e.g., using near field communication (NFC)) the characteristic value measured through the communication module, to an external device.

The flexible element may also include an insulator that covers an outer surface of the second electrode 250. The insulator may be formed of a resilient material including silicon and may electrically isolate the protection case 130 including the flexible element from the resilient dielectric body 210, the first flexible electrode 230, and the second flexible electrode 250.

Figure 3:
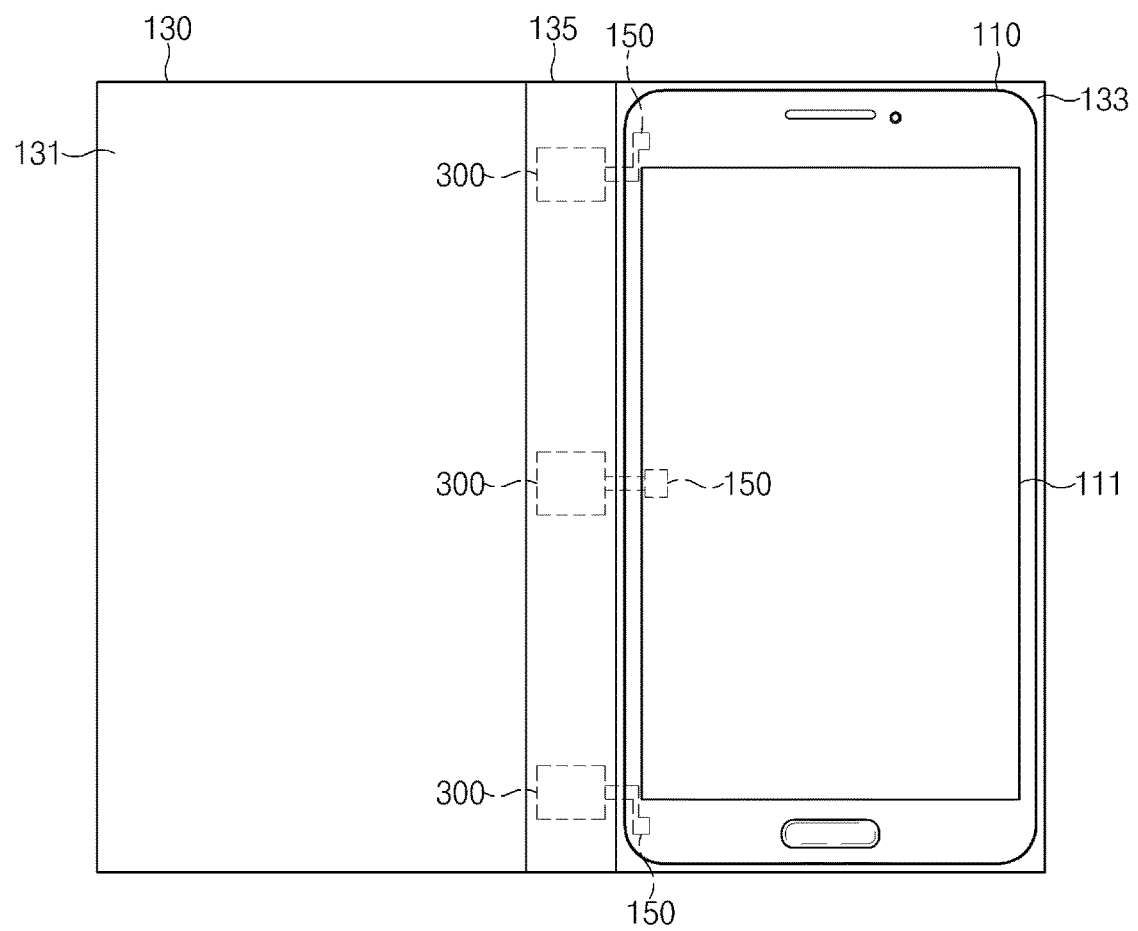
FIG. 3 illustrates a flexible element provided in a side surface part of a protection case according to an embodiment of the present disclosure.

FIG. 3 illustrates a flexible element provided in a side surface part of a protection case according to an embodiment of the present disclosure. Specifically, the protection case and portable electronic device are the same as illustrated in FIG. 1, except for the addition of flexible elements 300 and electrical connection parts 150. Accordingly, a repetitive description of the other elements of the protection case and portable electronic device is omitted.

Referring to FIG. 3, the hinge part of the protection case 130 includes the flexible elements 300. For example, the flexible elements 300 may have the same structure as illustrated in FIG. 2.

Although the flexible elements 300 are provided at an upper end, a central portion, and a lower end of the side surface part 135, the present disclosure is not limited thereto. For example, the flexible elements may be arranged in an area of the upper end, the central portion, or the lower end of the side surface part 135. Further, one of the flexible elements 300 may extend in a longitudinal direction of the side surface part 135 to be integrally formed from an upper end to a lower end of the side surface part 135.

The flexible elements 300 are electrically connected with the electrical connection parts 150 of the portable electronic device. Connection pins that contact the electrical connection parts 150 of the portable electronic device may be formed on the rear surface part 133 of the protection case 130, and the flexible elements 300 may be electrically connected with the connection pins. The connection pins contact the electrical connection parts 150 of the portable electronic device to be electrically connected with the electrical connection parts 150 of the portable electronic device when the portable electronic device is coupled to the protection case 130.

When the flexible elements 300 are provided in the hinge part formed in the side surface part 135 of the protection case 130, the portable electronic device may determine a change in the shape of the side surface part 135, for example, the curving or extension of the side surface part 135 through the flexible elements 300. Each of the flexible elements 300 may deliver a characteristic value based on their change in the shape, and the portable electronic device may compare a predefined characteristic value of the flexible elements 300 and the delivered characteristic values to determine a change in the shape of the side surface part 135. Further, the portable electronic device may determine a curving degree of the side surface part 135 to determine whether the front surface part 131 covers a front surface of the housing 110 of the portable electronic device, based on the comparison result.

Figure 4:
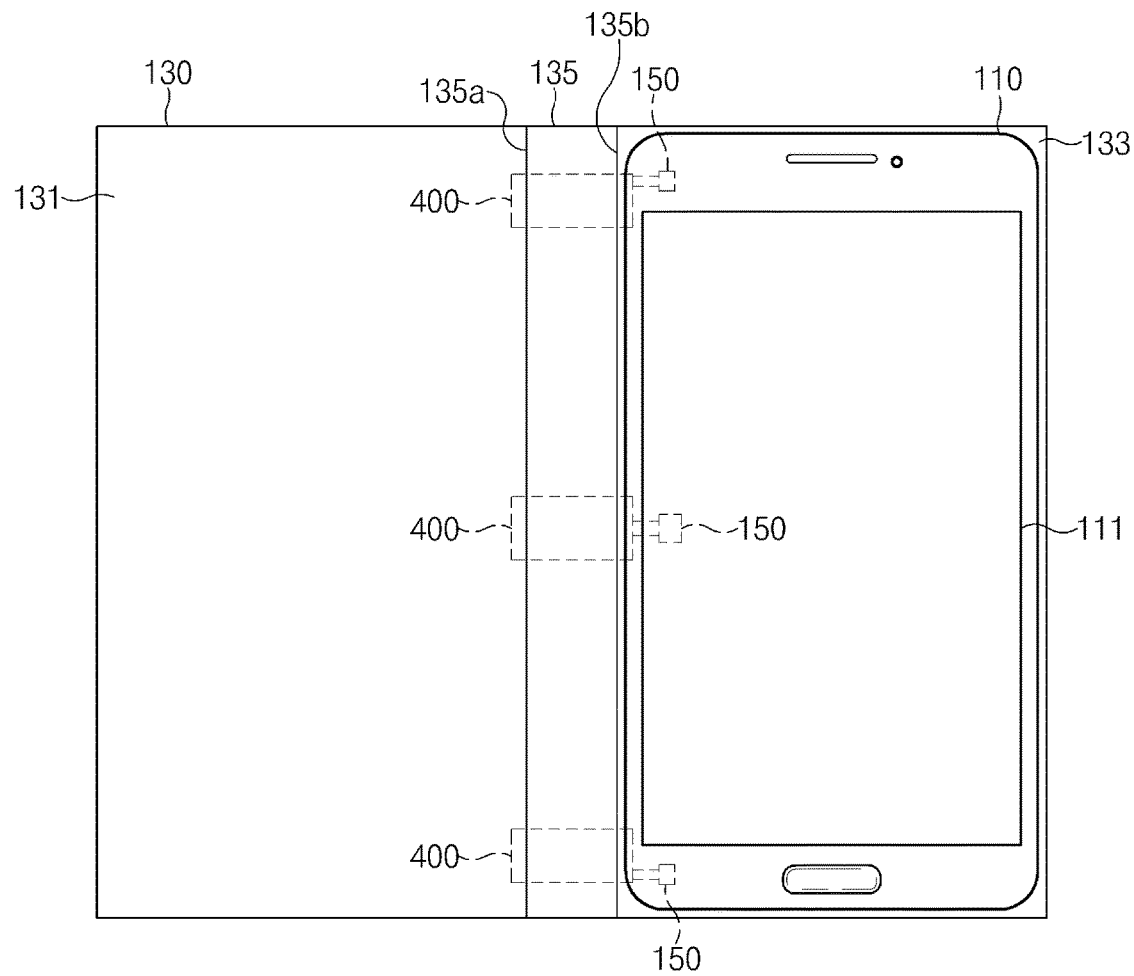
FIG. 4 illustrates flexible elements integrally formed over portions of a front surface part and a rear surface part, including a side surface part of the protection case, according to an embodiment of the present disclosure.

FIG. 4 illustrates flexible elements are integrally formed over portions of a front surface part and a rear surface part, including a side surface part of the protection case, according to an embodiment of the present disclosure. Specifically, the protection case and portable electronic device in FIG. 4 are the same as illustrated in FIG. 3, except that flexible elements 400 extend across the side surface part of the protection case from the front surface part to the rear surface part. Accordingly, a repetitive description of the other elements of the protection case and portable electronic device is omitted.

Referring to FIG. 4, a first hinge part and a second hinge part are formed in an area in which the front surface part 131 and the side surface part 135 are connected with each other (e.g., at line 135a), and a third hinge part is formed in an area in which the rear surface part 133 and the side surface part 135 are connected with each other (e.g., at line 135b). Accordingly, the flexible elements 400 transverse the first hinge part, the second hinge part, and the third hinge part. For example, the flexible elements 400 may have the same structure as illustrated in FIG. 2.

Although FIG. 4 illustrates the flexible elements 400 arranged in the interiors of the upper end, the central portion, and the lower end of the protection case 130, respectively, the present disclosure is not limited thereto. As described above, the flexible elements 400 may be arranged in one or two of the upper end, the central portion, or the lower end of the protection case 130, or one of the flexible elements 400 may extend in a longitudinal direction of the protection case 130 to be integrally formed from an upper end to a lower end of the protection case 130.

In FIG. 4, similar to FIG. 3, the portable electronic device may determine a change in the shape of the area in which the front surface part 131 and the side surface part 135 are connected with each other, a change in the shape of the area in which the rear surface part 133 and the side surface part 135 are connected with each other, and a change in the shape of the side surface part 135, through the flexible elements 400. Accordingly, the portable electronic device may determine an opening/closing state of the protection case 130.

Figure 5:
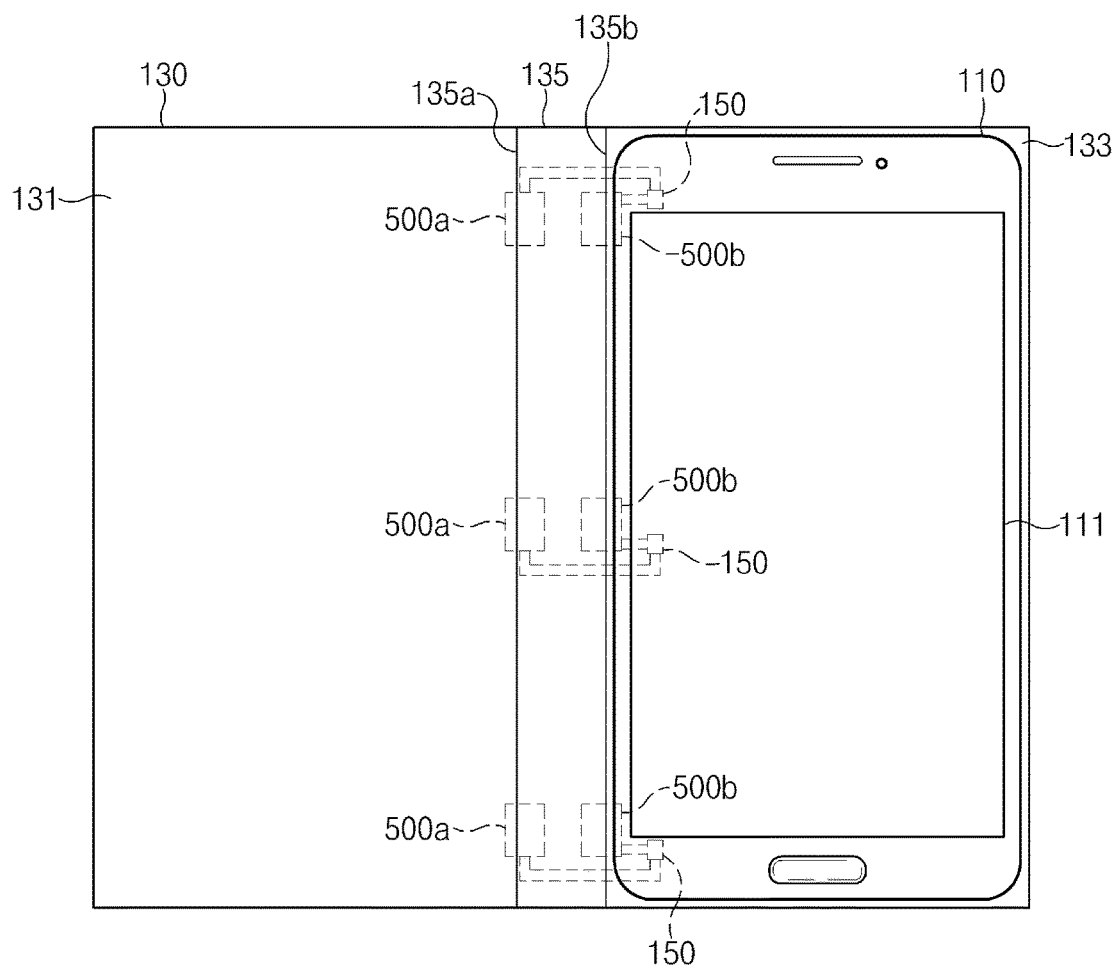
FIG. 5 illustrates a separated flexible element provided in a side surface part and a front surface part, and the side surface part and a rear surface part of a protection case according to an embodiment of the present disclosure.

FIG. 5 illustrates a state in which a flexible element is separated to be provided in a side surface part and a front surface part, and the side surface part and a rear surface part of a protection case according to an embodiment of the present disclosure. Specifically, the protection case and portable electronic device in FIG. 5 are the same as illustrated in FIG. 4, except that flexible elements 400 are replaced by first flexible elements 500a and second flexible elements 500b. Accordingly, a repetitive description of the other elements of the protection case and portable electronic device is omitted.

Referring to FIG. 5, the first flexible elements 500a are arranged in the first hinge part, and the second flexible elements 500b are arranged in the second hinge part. For example, each of the first flexible elements 500a and the second flexible elements 500b may have the same structure as illustrated in FIG. 2.

Although FIG. 5 illustrates the first flexible elements 500a and the second flexible elements 500b are arranged in the first hinge part and the second hinge part, respectively, in each of the interiors of the upper end, the central portion, and the lower end of the protection case 130, the present disclosure is not limited thereto. As described above, at least one of the first flexible elements 500a or the second flexible elements 500b may be provided at least an area of an upper end, a central portion, or a lower end of the protection case 130, or one pair of the first flexible elements 500a and the second flexible elements 500b may extend in a longitudinal direction of the protection case 130 to be integrally formed from an upper end to a lower end of the protection case 130.

As illustrated in FIG. 5, the first flexible elements 500a are provided in the first and second hinge parts formed where the front surface part 131 and the side surface part 135 of the protection case 130 are connected with each other, and the second flexible elements 500b are provided in the second and third hinge parts formed where the rear surface part 133 and the side surface part 135 are connected with each other. Accordingly, the portable electronic device may determine an angle defined by the front surface part 131 and the side surface part 135 and an angle defined by the rear surface part 133 and the side surface part 135, through the first and second flexible elements 500a and 500b. In FIG. 5, an opening/closing state of the protection case 130 may be determined more accurately than in FIGS. 3 and 4, by using the angle defined by the front surface part 131 and the side surface part 135 and the angle defined by the rear surface part 133 and the side surface part 135.

Figure 6:
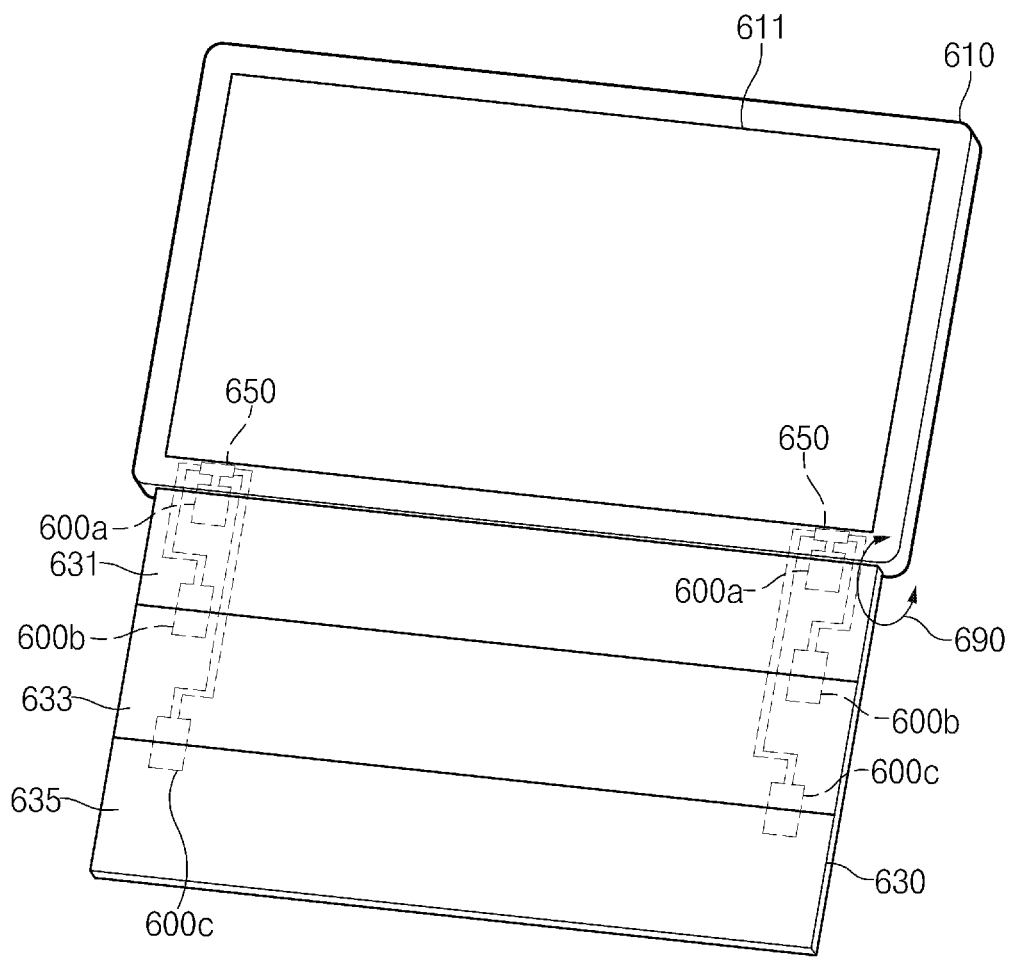
FIG. 6 illustrates a foldable protection case including a flexible element according to an embodiment of the present disclosure.

FIG. 6 illustrates a foldable protection case including a flexible element according to an embodiment of the present disclosure.

Referring to FIG. 6, the portable electronic device includes a protection case 630 that may be folded to cover a surface on of a housing 610 on which a display 611 is arranged or to provide a stand for the portable electronic device. The protection case 630 may be coupled to the housing 610 to be attached to or detached from one side of the housing 610. Further, the protection case 630 may be integrally formed with the housing 610 while being connected with one side of the housing 610. The protection case 630 may have a single plate shape. The protection case 630 may have a single plate shape that is connected with one side of the housing 610. In this case, the protection case 630 may rotate about a portion of a side surface thereof, which is connected with the housing 610, and may cover a portion of the side surface, which is connected with the housing 610 and a front surface thereof, or a portion of the side surface and a rear surface thereof, based on a hinge operation.

The foldable protection case 630 may be divided into a plurality of connected areas. Although FIG. 6 illustrates the protection case 630 is divided into a first area 631, a second area 633, and a third area 635, where a side of the first area 631 is connected with a side of the housing 610 of the portable electronic device, an opposite side of the first area 631 is connected with a side of the second area 633, and an opposite side of the second area 633 is connected with a side of the third area 635, the present disclosure is not limited thereto. For example, at least one of the above-described areas of the protection case 630 may be omitted or at least one other area may be further provided.

The hinge parts may be formed in an area in which the housing 610 and the protection case 630 are connected with each other and areas in which the areas are connected with each other. For example, a first hinge part may be formed in an area in which the housing 610 and the first area 631 are connected with each other, a second hinge part may be formed in an area in which the first area 631 and the second area 633 are connected with each other, and a third hinge part may be formed in an area in which the second area 633 and the third area 635 are connected with each other.

Flexible elements may be arranged in the first hinge part, the second hinge part, and the third hinge part, respectively.

In FIG. 6, first flexible elements 600a, second flexible elements 600b, and third flexible elements 600c are arranged in the first hinge part, the second hinge part, and the third hinge part, respectively, and are electrically connected with electrical connection parts 650 of the portable electronic device.

Alternatively, the flexible elements 600a, 600b, and 600c may extend in a longitudinal direction of the protection case 630 to be integrally formed from an upper end (e.g., the first hinge part) to a lower end (e.g., the third hinge part) of the protection case 630. Further, the flexible elements 600a, 600b, and 600c may extend in a transverse direction of the protection case 630 and may be arranged in the first hinge part, the second hinge part, and the third hinge part, respectively. Further, the flexible elements 600a, 600b, and 600c may extend in a transverse direction and a longitudinal direction of the protection case 630.

The portable electronic device may determine whether the protection case 630 covers at least one surface of the housing 610, based on the characteristics of the flexible elements 600a, 600b, and 600c. For example, the portable electronic device may determine a state of the protection case 630 by determining an angle defined by the housing 610 and the protection case 630 and angles defined by the plurality of divided areas. For example, when the angle defined by the housing 610 and the first area 631 corresponds to an acute angle that is close to 0 degree, the portable electronic device may determine that at least a portion of the protection case 630 covers at least a portion of the front surface of the housing 610. When the angle defined by the housing 610 and the first area 631 corresponds to an acute angle that is close to 0 degree, and the angle defined by the first area 631 and the second area 633 and the angle defined by the second area 633 and the third area 635 correspond to a straight angle (or 180 degrees) or an obtuse angle that is close to the straight angle, the portable electronic device may determine that the protection case 630 covers the front surface of the housing 610.

The portable electronic device may determine whether the protection case 630 is folded, using the flexible elements 600a, 600b, and 600c. For example, when the angles defined by the plurality of divided areas (e.g., the angle defined by the first area 631 and the second area 633 and the angle defined by the second area 633 and the third area 635) corresponds to a specific angle (e.g., 60 degrees) in a range of acute angles, the portable electronic device may determine that the protection case 630 is folded towards the front surface of the housing 610. Further, when the angles defined by the plurality of divided areas correspond to a specific angle (e.g., 300 degrees) in a range of obtuse angles, the portable electronic device may determine that the protection case 630 is folded toward the rear surface of the housing 610.

Figure 7:
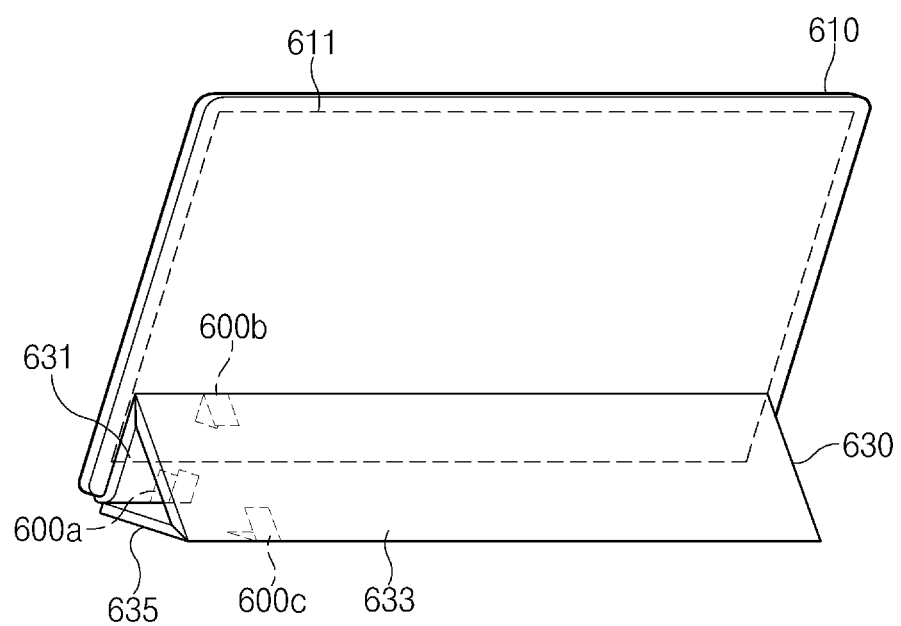
FIG. 7 illustrates a protection case folded into a stand for a portable electronic device according to an embodiment of the present disclosure.

FIG. 7 illustrates a protection case folded into a stand for a portable electronic device according to an embodiment of the present disclosure.

Referring to FIG. 7, the foldable protection case 630 is folded such that the portable electronic device 600 may be supported at an angle when the stand is placed on a level surface.

As illustrated in FIG. 7, an angle defined by the first area 631 and the second area 633 and an angle defined by the second area 633 and the third area 635 correspond to a specific angle (e.g., 60 degrees) in a range of acute angles, the areas of the protection case 630 may be folded towards the front surface of the housing 610 to form a triangular stand. In this state, if an angle defined by the housing 610 and the first area 631 corresponds to an obtuse angle that is close to 360 degrees, the protection case 630 having a triangular shape is bent towards the rear surface of the housing 610 such that the first area 631 and rear surface of the housing 610 face each other and the portable electronic device may be held at an angle on the level surface. Further, an angle defined by the first area 631 and the second area 633 and an angle defined by the second area 633 and the third area 635 correspond to a specific angle (e.g., 300 degrees) in a range of obtuse angles, the areas of the protection case 630 may be folded towards the rear surface of the housing 610 to define the triangular shape. In this state, if an angle defined by the housing 610 and the first area 631 corresponds to an obtuse angle (e.g., 300 degrees), the protection case 630 having the triangular shape is bent towards the rear surface of the housing 610 such that the third area 635 and the rear surface of the housing 610 face each other so that the portable electronic device may be held on the level surface.

The portable electronic devices illustrated in FIGS. 1-7 may terminate an application that is being executed or execute a specific application based on the states of the protection cases (e.g., the protection case 130 or the protection case 630). For example, when the protection case covers a front surface, e.g., a display, of the portable electronic device, the portable electronic device may terminate an application that is being executed. Further, when a portable electronic device is supported by the foldable protection case 630, the portable electronic device may execute a specific application (e.g., a media player application), and may output an execution screen of the corresponding application on the display 611. The specific application may include an application that is set by a user.

The portable electronic device may store data (e.g., a characteristic value table) that defines characteristic values based on the shapes of the flexible elements arranged in the protection case in the memory provided in the portable electronic device. Accordingly, the portable electronic device may compare the data stored in the memory with the characteristic value acquired from the flexible elements and determine a state of the protection case.

Figure 8:
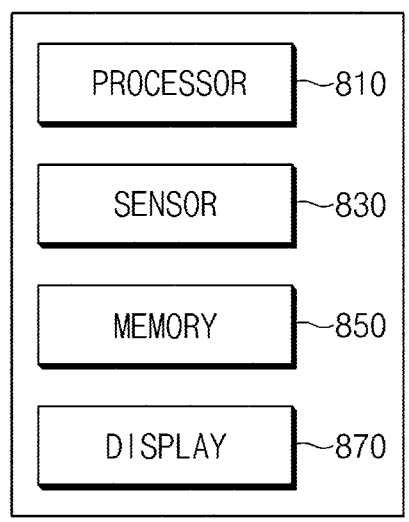
FIG. 8 illustrates a portable electronic device according to an embodiment of the present disclosure.

FIG. 8 illustrates a block diagram of a portable electronic device according to an embodiment of the present disclosure.

Referring to FIG. 8, the portable electronic device includes a processor 810, a sensor 830, a memory 850, and a display 870. The processor 810 may execute operations or data processing related to the control and/or communication of at least one other component of the portable electronic device. The processor 810 may analyze sensor information (e.g., a characteristic value of a flexible element of a protection case) acquired through the sensor 830 to determine a state of the protection case. The processor 810 may compare the characteristics values based on the shapes of the flexible element stored in the memory 850 with the characteristic value of the flexible element acquired through the sensor 830 to determine a state of the protection case.

The sensor 830, for example, may measure a physical quantity or detect an operational state of the portable electronic device, and may convert the measured or detected information to an electrical signal. The sensor 830 may include a flexible element (e.g., an EAP sensor), and may measure a characteristic value (e.g., a capacitance) based on a change of the shape of the flexible element. Further, the sensor 830 may deliver the measured characteristic value of the flexible element to the processor 810.

The memory 850 may store a command or data related to at least one other component of the portable electronic device. The memory 850 may store data (e.g., a characteristic value table) that defines characteristic values based on the shapes of the flexible element.

The display 870 may display various contents (e.g., a text, an image, a video, an icon, and a symbol). The display 870 may include a touch screen that receives a touch, a gesture, a proximity, and/or a hovering input using an electronic pen or a portion of the user's body.

The processor 810 may terminate an application that is being executed or execute a specific application stored in the memory 850, based on a state of the protection case, and may output the execution screen of the corresponding application on the display 870.

As described above, a portable electronic device may include a housing including a first surface that faces a first direction, a second surface that faces a second direction that is opposite to the first direction, and a side surface that surrounds at least a portion of a space between the first surface and the second surface, a processor that is arranged inside the housing, a memory that is arranged inside the housing, and a display that is exposed to the outside through at least one surface of the housing. The processor may be configured to acquire a characteristic value that changes as a shape of at least one flexible element changes, from the flexible element, the flexible element being provided in a protection case that is formed to surround the at least one surface of the housing, and determine an opening/closing state of the protection case, in which the protection case opens or closes the housing, based in the characteristics value.

The flexible element may include an EAP sensor.

The characteristic value may include a capacitance.

The memory may store data that defines characteristic values based on the shapes of the flexible elements.

The processor may be configured to compare the characteristic value, which is acquired from the flexible element, with the characteristic values stored in the memory, and determine the opening/closing state of the protection case, based on the comparison.

The processor may be configured to terminate an application that is being executed or execute a specific application based on the opening/closing state of the protection case.

The protection case may be connected with one side surface of the housing and is integrally formed with the portable electronic device.

The protection case may have a plate shape.

The protection case may be divided into a plurality of areas to be folded.

The at least one flexible element may include at least one first flexible element that is arranged in a first area, which is connected with the housing, of the plurality of areas. And the processor may be configured to measure a first angle, which is defined by the first area and the housing, based on a characteristic value that is acquired from the first flexible element, and determine the opening/closing state of the protection case, based on the first angle.

The at least one flexible element may include at least one second flexible element that is arranged in an area in which the plurality of areas are connected with each other. And the processor may be configured to measure a second angle, which is defined by the plurality of areas, based on a characteristic value that is acquired from the second flexible element, and determine the folding/unfolding state of the protection case, based on the second angle.

The processor may be configured to execute a specific application that is stored in the memory when the protection case is folded such that the portable electronic device is held in a specific form.

A protection case of a portable electronic device may include a front surface part that covers a front surface of a housing of the portable electronic device, a side surface part that extends from the front surface part and covers a side surface of the housing, a rear surface part that extends from the side surface part and covers a rear surface of the housing, and at least one flexible element, which is arranged at at least a portion of the front surface part, the side surface part, or the rear surface part and of which a characteristic value changes as a shape of the flexible element changes.

The flexible element may include an EAP sensor.

The characteristic value may include a capacitance.

The flexible element may be arranged at a portion of the side surface part, and be configured to measure a characteristic value that changes as a curving degree of the side surface part changes.

The flexible element may be arranged at a portion of the front surface part and the rear surface part in an integral form, including the side surface part, and be configured to measure a characteristic value that changes as a first curving degree of the side surface part, a second curving degree of an area of the flexible element, to which the front surface part and the side surface part are connected, and a third curving degree of an area of the flexible element, to which the side surface part is connected change.

The at least one flexible element may include a first flexible element that is arranged at a portion of an area of the first flexible element, to which the front surface part and the side surface part are connected, and a second flexible element that is arranged at a portion of an area of the second flexible element, in which the rear surface part and the side surface part are connected with each other. And the first flexible element may be configured to measure a first characteristic value based on a first angle that is defined by the front surface part and the side surface part, and the second flexible element is configured to measure a second characteristic value based on a second angle that is defined by the rear surface part and the side surface part.

Figure 9:
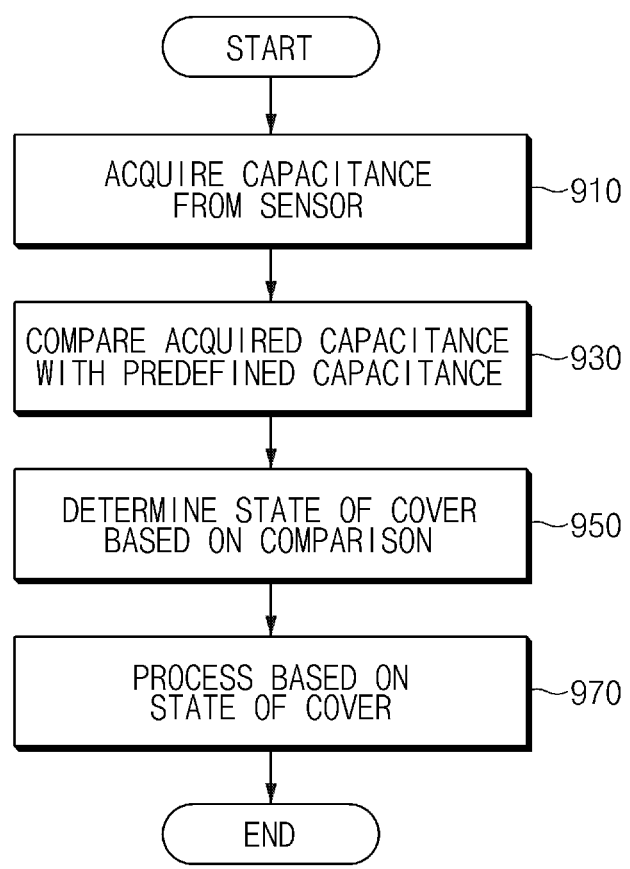
FIG. 9 illustrates a method of determining an opening/closing state of a protection case according to an embodiment of the present disclosure.

FIG. 9 illustrates a method of determining an opening/closing state of a protection case according to an embodiment of the present disclosure. For example, the method of FIG. 9 will be described as being performed by the portable electronic device of FIG. 8, but is not limited thereto.

Referring to FIG. 9, in step 910, a portable electronic device acquires a characteristic value of a flexible element from the sensor 830. For example, the portable electronic device may acquire a capacitance of the EAP sensor from the sensor 830.

In step 930, the portable electronic device compares the acquired characteristic value of the flexible element with the predefined characteristic values based on the shapes of the flexible element. The portable electronic device may compare the acquired capacitance of the EAP sensor with the capacitances based on the shapes of the EAP sensor, which are stored in the memory 850.

In step 950, the portable electronic device determines a state of the protection case, based on the comparison result from step 930. For example, the portable electronic device may determine whether the capacitance of the EAP sensor acquired from the sensor 830 is the same as or similar enough to the capacitance based on the shape of the EAP sensor, which is stored in the memory 850, and may determine the shape of the EAP sensor corresponding to the capacitance. For example, the portable electronic device may determine a curving degree or an extension degree of the EAP sensor corresponding to the capacitance.

In step 970, the portable electronic device performs processing based on the state of the protection case. For example, if it is determined that the protection case covers one surface (e.g., a front surface) of the portable electronic device, the portable electronic device may terminate an application having an execution screen that is being displayed on the display 870. However, when the protection case is folded to be stand for the portable electronic device, the portable electronic device may execute a specific application (e.g., a media player application), and may output an execution screen of the corresponding application on the display 870.

As described above, a method for determining a state of a protection case of a portable electronic device may include acquiring a characteristic value of a flexible element that is located in the interior of the protection case, from the flexible element, the characteristic value changing as a shape of the flexible element changes, comparing the characteristic value acquired from the flexible element with a predefined characteristic value based on the shape of the flexible element, and determining the state of the protection case based on the comparison.

The method may further include terminating an application, through which an execution screen is being displayed on a display that is exposed to the outside through one surface of the portable electronic device when the protection case covers the one surface of the portable electronic device, and executing a specific application when the protection case is folded such that the portable electronic device is held in the protection case.

Figure 10:
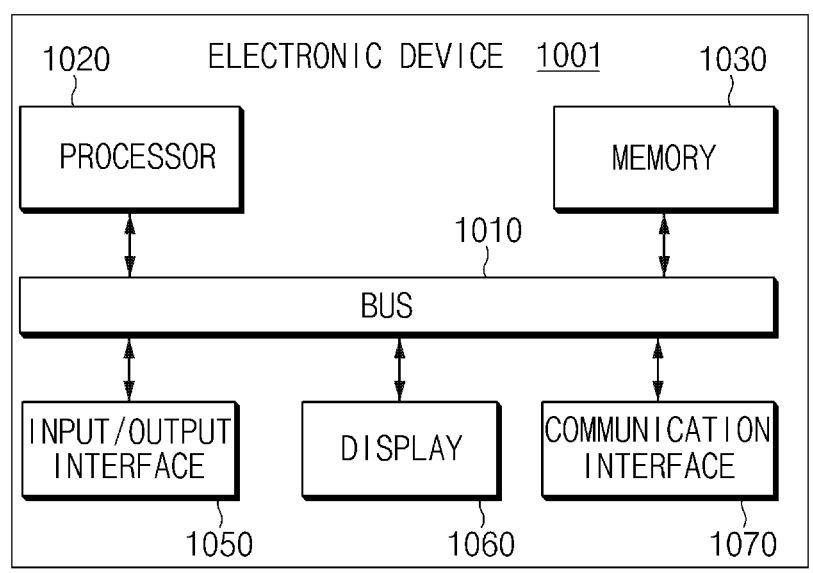
FIG. 10 illustrates an electronic device according to an embodiment of the present disclosure.

FIG. 10 illustrates an electronic device according to an embodiment of the present disclosure. For example, the portable electronic devices illustrated in FIGS. 1-7 may have configuration illustrated in FIG. 10.

Referring to FIG. 10, the electronic device 1001 includes a bus 1010, a processor 1020, a memory 1030, an input/output interface 1050, a display 1060, and a communication interface 1070. Alternatively, the electronic device 1001 may exclude at least one of the elements or may additionally include another element.

The bus 1010 may include a circuit for connecting the above-mentioned elements 1010 to 1070 to each other and transferring communications (e.g., control messages and/or data) among the above-mentioned elements.

The processor 1020 may include at least one of a CPU, an AP, or a communication processor (CP). The processor 1020 may perform data processing or an operation related to communication and/or control of at least one of the other elements of the electronic device 1001.

The memory 1030 may include a volatile memory and/or a nonvolatile memory. The memory 1030 may store instructions, an application, and/or data related to at least one of the other elements of the electronic device 1001.

The input/output interface 1050 may transfer an instruction or data input from a user or another external device to (an)other element(s) of the electronic device 1001. Further, the input/output interface 1050 may output instructions or data received from (an)other element(s) of the electronic device 1001 to the user or another external device.

The display 1060 may include a liquid crystal display (LCD), a light-emitting diode (LED) display, an organic light-emitting diode (OLED) display, a microelectromechanical systems (MEMS) display, or an electronic paper display. The display 1060 may present various to the user. The display 1060 may include a touch screen, and may receive a touch, gesture, proximity and/or hovering input from an electronic pen or a part of a body of the user.

The communication interface 1070 may set communications between the electronic device 1001 and an external device. For example, the communication interface 1070 may be connected to a network via wireless communications or wired communications in order to communicate with the external device. The communication interface 1070 may set communications between the electronic device 1001 and a flexible element included in a protection case.

Figure 11:
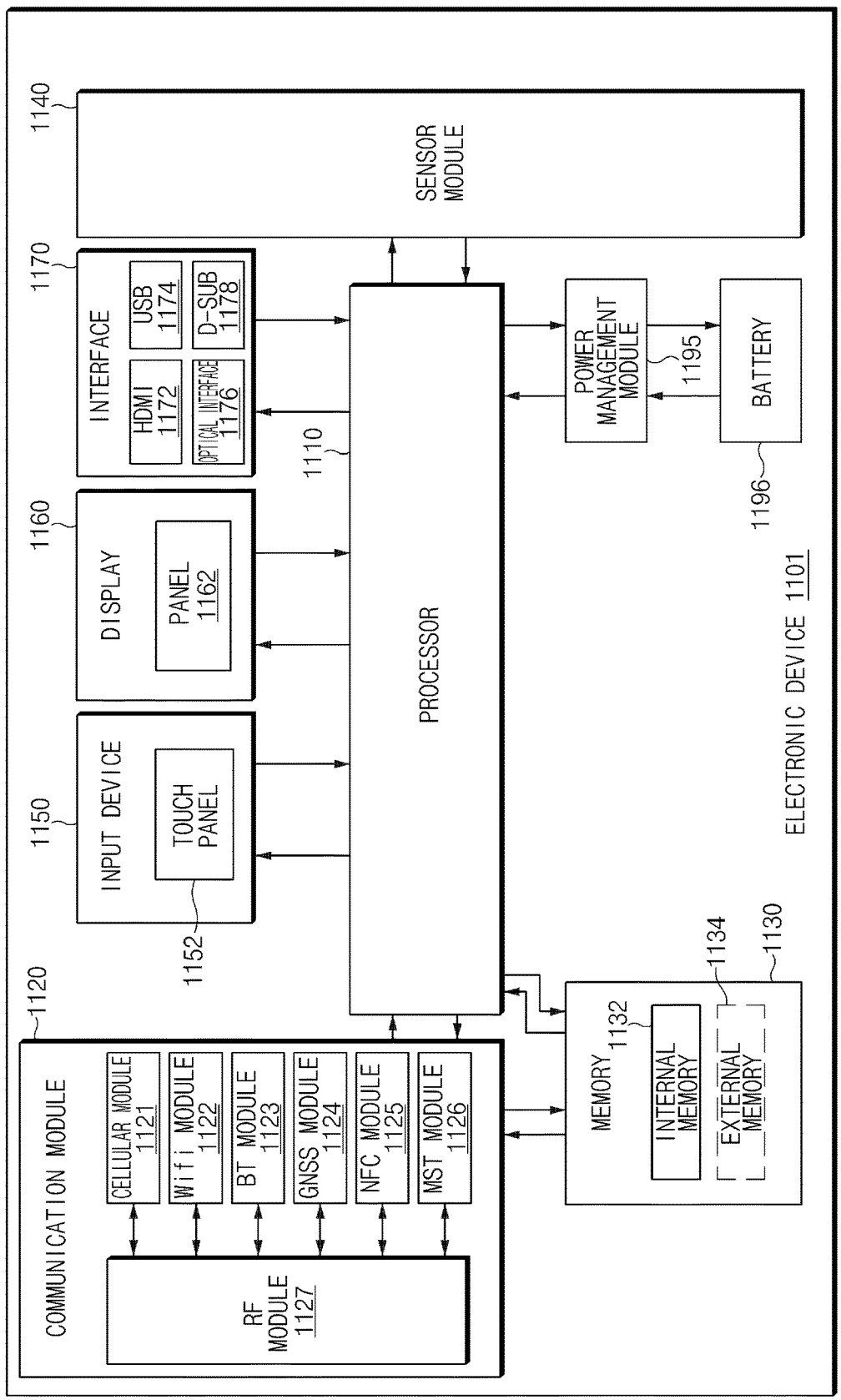
FIG. 11 illustrates an electronic device according to an embodiment of the present disclosure.

FIG. 11 illustrates an electronic device according to an embodiment of the present disclosure.

Referring to FIG. 11, an electronic device 1101 includes a processor (e.g., an AP) 1110, a communication module 1120, a memory 1130, a sensor module 1140, an input device 1150, a display 1160, an interface 1170, a power management module 1195, and a battery 1196.

The processor 1110 may run an operating system (OS) or an application program to control a plurality of hardware or software elements connected to the processor 1110, and may process various data and perform operations. The processor 1110 may be implemented with a system on chip (SoC). The processor 1110 may include a graphic processing unit (GPU) and/or an image signal processor. The processor 1110 may include at least a portion of the elements illustrated in FIG. 11 (e.g., a cellular module 1121). The processor 1110 may load, on a volatile memory, an instruction or data received from at least one of other elements (e.g., a nonvolatile memory) to process the instruction or data, and may store various data in a nonvolatile memory.

The communication module 1120 includes the cellular module 1121, a Wi-Fi module 1122, a Bluetooth (BT) module 1123, a GNSS module 1124 (e.g., a GPS module, a GLONASS module, a BeiDou module, or a Galileo module), an NFC module 1125, a magnetic secure transmission (MST) module 1126, and a radio frequency (RF) module to 1127.

The cellular module 1121 may provide a voice call service, a video call service, a text message service, and/or an Internet service through a communication network. The cellular module 1121 may identify and authenticate the electronic device 1101 in the communication network using a subscriber identification module (e.g., a subscriber identity module (SIM) card). The cellular module 1121 may perform at least a part of functions that may be provided by the processor 1110. The cellular module 1121 may include a CP.

Each of the Wi-Fi module 1122, the Bluetooth module 1123, the GNSS module 1124, the NFC module 1125, and the MST module 1126 may include a processor for processing data transmitted/received through the modules. At least two of the cellular module 1121, the Wi-Fi module 1122, the Bluetooth module 1123, the GNSS module 1124, the NFC module 1125, and the MST module 1126 may be included in a single integrated chip (IC) or IC package.

The RF module 1127 may transmit/receive communication signals (e.g., RF signals). The RF module 1127 may include a transceiver, a power amp module (PAM), a frequency filter, a low noise amplifier (LNA), an antenna, etc. At least one of the cellular module 1121, the Wi-Fi module 1122, the Bluetooth module 1123, the GNSS module 1124, the NFC module 1125, and the MST module 1126 may transmit/receive RF signals through a separate RF module.

The memory 1130 includes an internal memory 1132 and an external memory 1134. The internal memory 1132 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.)), a hard drive, or a solid state drive (SSD).

The external memory 1134 may include a flash drive such as a compact flash (CF), a secure digital (SD), a Micro-SD, a Mini-SD, an extreme digital (xD), a MultiMediaCard (MMC), a memory stick, etc. The external memory 1134 may be operatively and/or physically connected to the electronic device 1101 through various interfaces.

The sensor module 1140 may measure physical quantity or detect an operation state of the electronic device 1101 in order to convert measured or detected information into an electrical signal. For example, the sensor module 1140 may include a flexible element, and measure a characteristic value (e.g., capacitance) that changes as a shape of the flexible element changes.

The input device 1150 includes a touch panel 1152. The touch panel 1152 may employ at least one of capacitive, resistive, infrared, and ultraviolet sensing methods. The touch panel 1152 may further include a control circuit. The touch panel 1152 may further include a tactile layer so as to provide a haptic feedback to a user.

The display 1160 includes a panel 1162 that may be flexible, transparent, and/or wearable. The panel 1162 and the touch panel 1152 may be integrated into a single module. The display 1160 may further include a control circuit for controlling the panel 1162.

The interface 1170 includes a high-definition multimedia interface (HDMI) 1172, a universal serial bus (USB) 1174, an optical interface 1176, and a D-subminiature (D-sub) 1178 Additionally or alternatively, the interface 1170 may include a mobile high-definition link (MHL) interface, an SD card/multi-media card (MMC) interface, and/or an infrared data association (IrDA) interface.

The power management module 1195 may manage power of the electronic device 1101. The power management module 1195 may include a power management integrated circuit (PMIC), a charger integrated circuit (IC), and/or a battery gauge. The PMIC may employ a wired and/or wireless charging method. The wireless charging method may include a magnetic resonance method, a magnetic induction method, an electromagnetic method, etc. An additional circuit for wireless charging, such as a coil loop, a resonant circuit, a rectifier, etc., may also be included.

The battery gauge may measure a remaining capacity of the battery 1196 and a voltage, current, and/or temperature of the battery. The battery 1196 may include a rechargeable battery and/or a solar battery.

Each of the above-mentioned elements of an electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Some of the elements of the electronic device according to various embodiments of the present disclosure may be combined with each other to form one entity, thereby making it possible to perform the functions of the corresponding elements in the same manner as before the combination.

According to embodiments of the present disclosure, a transparent protection case may be provided using a flexible element, such that a portion of the front surface is not covered by a magnetic material.

Further, an opening/closing state of the protection case may be determined more accurately without an error due to an external material, by precisely determining an opening/closing state of the protection case based on a characteristic value of the flexible elements included in the hinge part of the protection case.

In addition, the present disclosure may provide various effects that are directly or indirectly recognized.

Herein the term "module" may represent a unit including one of hardware, software and firmware or a combination thereof. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. When the instructions are performed by a processor (e.g., the processor 1020), the processor may perform functions corresponding to the instructions. The computer-readable storage medium may be, for example, the memory 1030.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, etc.). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Further, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the described embodiments, but should be defined by the appended claims and equivalents thereof.

What is claimed is:

1. A portable electronic device, comprising:
   a housing a memory;
   a display; and
   a processor configured to:
      acquire, from a flexible element included in a protection case of the portable electronic device, a characteristic value of the flexible element, the characteristic value changing according to bending of the flexible element through movement of the protection case, and
      determine a state of the protection case, based in the acquired characteristic value,
   wherein the protection case has a plate shape, connects with a side surface of the portable electronic device, and is divided into a plurality of foldable areas.

2. The portable electronic device of claim 1, wherein the flexible element comprises an electro active polymer (EAP) sensor.

3. The portable electronic device of claim 2, wherein the characteristic value comprises a capacitance.

4. The portable electronic device of claim 1, wherein the memory stores data that defines characteristic values based on shapes of the flexible element.

5. The portable electronic device of claim 4, wherein the processor is further configured to:
   compare the acquired characteristic value with the characteristic values stored in the memory; and
   determine the state of the protection case, based on the comparison.

6. The portable electronic device of claim 1, wherein the processor is further configured to terminate an executed application or execute a specific application based on the state of the protection case.

7. The portable electronic device of claim 1, wherein the flexible element is arranged in a first foldable area, which is connected with the portable electronic device, and
   wherein the processor is further configured to:
      measure a first angle, which is defined by the first foldable area and the housing, based on the characteristic value acquired from the flexible element; and
      determine the state of the protection case, based on the first angle.

8. The portable electronic device of claim 7, wherein the protection case further includes a second flexible element arranged in an area at which the plurality of foldable areas are connected with each other, and
   wherein the processor is further configured to:
      measure a second angle, which is defined by the plurality of foldable areas, based on a characteristic value that is acquired from the second flexible element; and
      determine the state of the protection case, based on the second angle.

9. The portable electronic device of claim 8, wherein the processor is further configured to execute a specific application that is stored in the memory, when the determined state of the protection case is a stand for the portable electronic device.

* * * * *